US012522950B2

(12) United States Patent
Hu et al.

(10) Patent No.: US 12,522,950 B2
(45) Date of Patent: Jan. 13, 2026

(54) METHODS FOR PREPARING POLYURETHANE FILM AND FABRICS COMPRISING THE SAME

(71) Applicants: NANODOCKS TECHNOLOGY LIMITED, Hong Kong (CN); CITY UNIVERSITY OF HONG KONG, Hong Kong (CN)

(72) Inventors: Jinlian Hu, Hong Kong (CN); Jieqiong Yang, Hong Kong (CN); Shuo Shi, Hong Kong (CN); Yifan Si, Hong Kong (CN); Siu Wah Wong, Hong Kong (CN)

(73) Assignees: NANODOCKS TECHNOLOGY LIMITED, Hong Kong (CN); CITY UNIVERSITY OF HONG KONG, Hong Kong (CN)

( * ) Notice: Subject to any disclaimer, the term of this patent is extended or adjusted under 35 U.S.C. 154(b) by 525 days.

(21) Appl. No.: 18/098,860

(22) Filed: Jan. 19, 2023

(65) Prior Publication Data

US 2024/0247409 A1    Jul. 25, 2024

(51) Int. Cl.
  *D01D 5/00*  (2006.01)
  *C08G 18/42*  (2006.01)
  *D01D 1/02*  (2006.01)
  *D01F 6/70*  (2006.01)

(52) U.S. Cl.
  CPC .......... *D01D 5/0084* (2013.01); *C08G 18/42* (2013.01); *D01D 5/0038* (2013.01); *D10B 2331/10* (2013.01)

(58) Field of Classification Search
  CPC ...... D01D 1/02; D01D 5/0038; D01D 5/0084; C08G 5/18; C08G 2375/06; D10B 2331/10; D01F 6/70
  See application file for complete search history.

(56) References Cited

U.S. PATENT DOCUMENTS 5,653,931 A * 8/1997 Eibl ............................ C08J 5/18
                                                                   264/187
2024/0216584 A1* 7/2024 Slepian ................ D01D 5/0076

FOREIGN PATENT DOCUMENTS

| CN | 102517794 A | * | 6/2012 | |
|---|---|---|---|---|
| CN | 104562444 A | * | 4/2015 | ............... D01D 5/00 |
| CN | 111020885 A | * | 4/2020 | ........... D01D 5/0069 |
| CN | 111705430 A | * | 9/2020 | ............. D04H 3/009 |

* cited by examiner

Primary Examiner — Emmanuel S Luk
(74) Attorney, Agent, or Firm — WPAT, PC (57) ABSTRACT

The present invention discloses a method for preparing a polyurethane film, comprising the steps of: i) dissolving polyurethane into a first solvent to form a first solution; ii) dissolving salt into a second solvent to form a second solution; iii) preparing a spinning stock solution by mixing said first solution and said second solution; iv) spinning said spinning stock solution in an electrospinning device to obtain a polyurethane film; v) providing a container to which a third solvent is sprayed; and vi) arranging said polyurethane film in said container for a period of time.

19 Claims, 4 Drawing Sheets

METHODS FOR PREPARING POLYURETHANE FILM AND FABRICS COMPRISING THE SAME

FIELD OF THE INVENTION

The invention relates to electrospinning of fiber materials, in particular relates to electrospinning of self-adhesion high-performance polyurethane nanofiber film and a preparation method thereof. The prepared electrospun polyurethane nanofiber film has the characteristics of waterproof and moisture permeability, high strength, good moisture permeability, high comfort, and etc.

BACKGROUND

Polyurethane is regarded as good material for fabrics for making outdoor clothing, due to its low material cost and good waterproof and wear resistance.

Existing polyurethane-based fabrics are mostly prepared by a coating process on fabrics. Despite the preparation process is complicated, most of these polyurethane-based fabrics have problems of inflexible adjustment on pore structures, rendering disadvantages such as poor air permeability and moisture permeability and low comfort.

Electrospinning technology enables polyurethane, in fiber form, to be coated on fabrics with stable microporous structure, whereby providing interconnected channels for water vapor transmission, making the fabric breathable, moisture-permeable, high wearing comfort, and more suitable for outdoor travel.

Prior art discloses technology of electrospun polyurethane nanofiber membrane, such as: Chinese patent application publication No. CN111705430A, which is concerned with a high strength polyurethane waterproof and moisture permeable membrane and the preparation method thereof; Chinese patent application publication No. CN102517794A, which is concerned with a preparation method of breathable and impermeable polyurethane nanofiber membrane; and Chinese patent application publication No. CN104562444A, which is concerned with an electrostatic spraying nano-cobweb waterproof moisture-permeable film and preparation method thereof. However, the state of art, in particular the cited publications above, fails to provide the properties of high mechanical strength while providing excellent moisture permeability and breathability, leading to low wearing comfort for users when the polyurethane-based fabrics prepared by these methods is in use.

Although conventional methods such as solvent vapor welding technology or using single solvent for cross-linking the polyurethane fibers may help solving the problem of low mechanical strength, these methods cause the fibers to be dissolved or cured too fast. In other words, the cross-linking happens in an uncontrolled manner with insufficient cross-linking between the fibers, thus failure in providing fabrics with good performance in waterproof and moisture-permeability.

To address the above technical problems, the present invention proposes a method, or at least to provide an alternative to the public, for preparing polyurethane film, which provides the characteristics of waterproof and moisture permeability, based on polyurethane fibers self-adhesion by optimized solvent vapor welding by addition of additives and optimization on process parameters. The method allows the fiber shape can be adjusted and modified, so that the fibers are spontaneously cross-linked and bonded, and eventually the polyurethane-based is formed with enhanced mechanical properties while providing excellent moisture permeability and breathability. The film prepared by the method has small thickness and thus provides high comfort, which is suitable for making high performance fabrics providing excellent performance in waterproofing and moisture-permeability for outdoor clothing.

Needle electrospinning is a simple and versatile process, however limitations such as its low productivity and the use of needles as spinnerets would cause needle easy clogging present some challenges in making nanofibers therefrom. Although researches look into the development of multi-needle electrospinning in recent years for increasing productivity, the problem of needle clogging still happens. To this end, multi-channel needleless electrospinning systems have been developed to increase fibers productivity and to overcome the needle-related challenges of electrospinning processes. However, the conversion from needle-based electrospinning equipment to multi-channel needle-free electrospinning equipment requires not only the adjustment of the process parameters of the equipment, but also the conditions of the electrospinning stock solution, which provides many difficulties in efficient production. The present invention also seeks to address this problem, or at least to provide an alternative to the public, by providing a method for preparing polyurethane film, which is suitable for both needle-based electrospinning device and needle-free electrospinning device. The present invention allows an effective technology transfer from a laboratory-scale to an industrialized scale.

SUMMARY

A first aspect of the present invention relates to a method for preparing a polyurethane film, comprising the steps of: i) dissolving polyurethane into a first solvent to form a first solution; ii) dissolving salt into a second solvent to form a second solution; iii) preparing a spinning stock solution by mixing said first solution and said second solution; iv) spinning said spinning stock solution in an electrospinning device to obtain a polyurethane film; v) providing a container to which a third solvent is sprayed; and vi) arranging said polyurethane film in said container for a period of time.

In one embodiment, said polyurethane is a hydrophobic polyester thermoplastic polyurethane.

In one embodiment, said polyurethane is a ABn-type block linear polymer, wherein A is a polyester and B is a diol. Preferably, said polyester has molecular weight of 1000-6000. More preferably, said diol contains 2-12 linear carbon atoms. Advantageously, the chemical structure between the AB segments is diisocyanate. More advantageously, the density of said polyurethane is 1.10-1.25 g/cm3.

In one embodiment, said salt is inorganic salt selected from a group comprising lithium chloride, sodium chloride, potassium chloride, lithium carbonate, sodium carbonate, potassium carbonate, sodium bicarbonate, lithium nitrate, sodium nitrate, and a combination thereof; and/or organic salt selected from a group comprising octadecyltrimethylammonium chloride, tetraethylammonium bromide, and a combination thereof.

In one embodiment, said first solvent, said second solvent, and said third solvent are selected from a group comprising acetone, N,N-dimethylformamide, N,N-dimethylacetamide, tetrahydrofuran, acetonitrile, ether, ethane, ethanol, formic acid, acetic acid, chloroform, carbon tetrachloride, sulfolane, pyrimidine, formamide, n-hexane, chlorobenzene, dioxane, vinyl glycol, methylcyclohexane, 1,2-Dichloroethylene xylene, cyclohexane, pentane, anisole, butyl acetate, isopropyl acetate, dimethyl alum, N-methylpyrrolidone, dichloromethane, dichloroethyl alkane, chloromethane, benzene, toluene, ethyl acetate, and a combination thereof. Preferably, the weight ratio of said polyurethane in said first solution is 15-30%. More preferably, the weight ratio of said salt in said second solution is 0.1-2%. Advantageously, the weight ratio of said first solution to said second solution ranges from 50:0 to 35:15. More advantageously, said third solvent is prepared by mixing said first solvent with water; and/or said water is deionized water.

In one embodiment, step vi) in claim 1 is carried out at temperature 25-35° C. In another embodiment, step vi) in claim 1 is carried out at humidity 30%-85% and/or the amount of said third solvent sprayed is 0.5 to 5 ml.

In one embodiment, step iv) in claim 1 is carried out in a single-needle electrospinning device, with at least one of the following parameters: applied voltage at 20-30 kV, the flow rate of syringe pump at 0.1-1.0 ml/h, the receiving distance at 10-20 cm, the ambient temperature at 23-35° C., the ambient humidity at 35%-85%, the receiving substrate is selected from aluminum foil, oil paper, fabric or non-woven fabric.

In one embodiment, step iv) in claim 1 is carried out in a needle-free electrospinning device, with at least one of the following parameters: applied voltage at 50-80 kV, the receiving distance at 20-50 cm, the ambient temperature at 23-35° C., the ambient humidity at 35%-85%, the receiving substrate is selected from aluminum foil, oil paper, fabric or non-woven fabric. In particular, said needle-free electrospinning device is a multi-channel needle-free electrospinning device.

A second aspect of the present invention relates to a polyurethane-based film prepared by a method as described in the first aspect. In one embodiment, the film prepared has at least one of the following properties: thickness of 15±5 μm, breaking strength of 15-35 MPa, breaking elongation of 100-170%, and moisture permeability of 18-22 kg/(m²·24 h).

BRIEF DESCRIPTION OF THE DRAWINGS

Some embodiments of the present invention will now be explained, with reference to the accompanied figures, in which:—

DETAILED DESCRIPTION OF PREFERRED EMBODIMENTS OF THE INVENTION

This disclosure is now presented by way of examples with reference to the figures in the following paragraphs. Objects, features, and aspects of the present disclosure are disclosed in or are apparent from the following description. It is to be understood by one of ordinary skilled in the art that the following discussion is a description of exemplary embodiments only, and is not intended as limiting the broader aspects of the present disclosure, which broader aspects are embodied in the exemplary constructions.

Unless otherwise specified, all chemicals described herein are commercially available and are used as received, which may include impurities, for example, residual solvents or by-products. Machine for preparing a film by electrospinning is performed by an electrospun machine provided by Kato Tech Co.

Electrospinning films prepared in embodiments below may comprises the following steps:

Dissolving of solid thermoplastic polyurethane (TPU) to form solution A, or a first solution Dissolving of salts to form solution B, or a second solution Preparation of an electrospun film with solution A or a mixed solution between solutions A & B Post-processing the electrospun film, by solvent vapor welding, in a container to which solvent C, or a third solution is sprayed Embodiments prepared with general steps described above but with specific formulations and conditions are illustrated below.

Embodiment 1

1) Dissolving 6 grams of solid thermoplastic polyurethane (TPU) in 34 grams of solvent N,N-dimethylformamide (DMF) by stirring at 60° C. for 10 hours, by which homogenous solution A is obtained. Solution A is then cooled to room temperature for later use.

2) At room temperature, adding 0.1 gram of lithium chloride (LiCl) to 9.9 grams of DMF, and then stirring it to obtain solution B.

3) Mixing solution A and solution B in a weight ratio of 40:10, stirring it at room temperature until a viscous and transparent spinning stock solution is obtained. The spinning stock solution is then cooled to room temperature for later use.

4) Spinning the spinning stock solution obtained in step 3) in a single-needle electrospinning device for 20 hours under the condition of 28 kV high voltage, the flow rate of the syringe pump is set to 0.2 ml/h, and the receiving distance is 20 cm; using aluminium foil as the receiving substrate. After that, the pre-treated electrospun polyurethane nanofiber film is prepared and formed on the aluminium foil.

5) Providing an airtight container, to which solvent C prepared by DMF and deionized water in volume ratio 1:1 is sprayed. Arranging the prepared film, prepared in step 4), in the airtight container, at ambient temperature 25° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 15 μm, and the average diameter of the nanofibers is 200 nm.

Embodiment 2

1) Preparing a mixed solvent with tetrahydrofuran (THF) and N,N-dimethylformamide (DMF) in volume ratio of 1:2. Dissolving 6 grams of solid thermoplastic polyurethane (TPU) in 39 grams of the mixed solvent by stirring at 50° C. for 10 hours, by which, homogenous solution A is obtained. Solution A is then cooled to room temperature for later use.

2) At room temperature, adding 0.05 gram of lithium chloride (LiCl) and 0.05 gram of lithium bromide (LiBr) to 4.9 grams of the mixed solvent prepared in step 1), and then stirring it to obtain solution B.
3) Mixing solution A and solution B in a weight ratio of 45:5, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 25 hours under the condition of 25 kV high voltage, the flow rate of the syringe pump is set to 0.1 ml/h, and the receiving distance is 15 cm; using aluminium foil as the receiving substrate. After that, the pre-treated electrospun polyurethane nanofiber film is prepared and formed on the aluminium foil.
5) Providing an airtight container, to which solvent C prepared by the mixed solvent prepared in step 1) and deionized water in volume ratio 1:1 is sprayed. Arranging the prepared film, prepared in step 4), in the airtight container, at ambient temperature 25° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 15 μm, and the average diameter of the nanofibers is 250 nm.

Embodiment 3

1) Preparing a mixed solvent with N,N-dimethylformamide (DMF) and dimethyl sulfite (DMSO) in volume ratio of 1:1. Dissolving 5 grams of solid thermoplastic polyurethane (TPU) in 45 grams of the mixed solvent by stirring at 60° C. for 10 hours, by which, homogenous solution A is obtained. Solution A is then cooled to room temperature for later use.
2) Spinning the spinning stock solution obtained in step 1) in a single-needle electrospinning device for 12 hours under the condition of 30 kV high voltage, the flow rate of the syringe pump is set to 0.3 ml/h, and the receiving distance is 15 cm; using aluminium foil as the receiving substrate. After that, the pre-treated electrospun polyurethane nanofiber film is prepared and formed on the aluminium foil.
3) Providing an airtight container, to which solvent C prepared by the mixed solvent prepared in step 1) and deionized water in volume ratio 1:2 is sprayed. Arranging the prepared film, prepared in step 2), in the airtight container, at ambient temperature 25° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 20 μm, and the average diameter of the nanofibers is 250 nm.

Embodiment 4

1) Dissolving 5 grams of solid thermoplastic polyurethane (TPU) in 30 grams of solvent tetrahydrofuran (THF) by stirring at 60° C. for 10 hours, by which homogenous solution A is obtained. Solution A is then cooled to room temperature for later use.
2) At room temperature, adding 0.05 gram of sodium chloride (NaCl), 0.05 gram of lithium chloride (LiCl), 0.05 gram of potassium chloride (KCl), and 0.05 grams of sodium carbonate ($Na_2CO_3$) to 14.8 grams of the mixed solved prepared in step 1), and then stirring it to obtain solution B.
3) Mixing solution A and solution B in a weight ratio of 35:15, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 15 hours under the condition of 20 kV high voltage, the flow rate of the syringe pump is set to 0.1 ml/h, and the receiving distance is 15 cm; using aluminium foil as the receiving substrate. After that, the electrospun polyurethane nanofiber film is prepared and formed on the aluminium foil.

After that, peeling the electrospun polyurethane nanofiber film off from the aluminium foil and resting the peeled film at room temperature for 12 hours. The average thickness of the peeled film, i.e. polyurethane nanofiber film, is 10 μm, and the average diameter of the nanofibers is 300 nm.

Embodiment 5

1) Dissolving 10 grams of solid thermoplastic polyurethane (TPU) in 30 grams of N-methylpyrrolidone (NMP) by stirring at 50° C. for 10 hours, by which, homogenous solution A is obtained. Solution A is then cooled to room temperature for later use.
2) At room temperature, adding 0.1 gram of sodium carbonate ($Na_2CO_3$) to 9.9 grams of NMP, and then stirring it to obtain solution B.
3) Mixing solution A and solution B in a weight ratio of 40:10, respectively, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 20 hours under the condition of 28 kV high voltage, the flow rate of the syringe pump is set to 0.2 ml/h, and the receiving distance is 20 cm; using aluminium foil as the receiving substrate. After that, the pre-treated electrospun polyurethane nanofiber film is prepared and formed on the aluminium foil.
5) Providing an airtight container, to which solvent C prepared by NMP and deionized water in volume ratio 1:2 is sprayed. Arranging the prepared film, prepared in step 4), in the airtight container, at ambient temperature 30° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 15 μm, and the average diameter of the nanofibers is 300 nm.

Embodiment 6

1) Preparing a mixed solvent with N-methylpyrrolidone (NMP) and tetrahydrofuran (THF) in volume ratio of 1:1.5. Dissolving 5 grams of solid thermoplastic polyurethane (TPU) in 30 grams of the mixed solvent by stirring at 60° C. for 10 hours, by which, homogenous solution A is obtained. Solution A is then cooled to room temperature for later use.

2) At room temperature, adding 0.1 gram of sodium chloride (NaCl) and 0.1 gram of sodium bicarbonate (NaHCO$_3$) to 14.8 grams of the mixed solvent prepared in step 1), and then stirring it to obtain solution B.
3) Mixing solution A and solution B in a weight ratio of 35:15, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 20 hours under the condition of 28 kV high voltage, the flow rate of the syringe pump is set to 0.2 ml/h, and the receiving distance is 15 cm; using aluminium foil as the receiving substrate. After that, the pre-treated electrospun polyurethane nanofiber film is prepared and formed on the aluminium foil.
5) Providing an airtight container, to which solvent C prepared by the mixed solvent prepared in step 1) and deionized water in volume ratio 1:4 is sprayed. Arranging the prepared film, prepared in step 4), in the airtight container, at ambient temperature 30° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 10 μm, and the average diameter of the nanofibers is 200 nm.

Embodiment 7

1) Preparing a mixed solvent with dimethyl sulfite (DMSO) and tetrahydrofuran (THF) in volume ratio of 1:2. Dissolving 5 grams of solid thermoplastic polyurethane (TPU) in 40 grams of the mixed solvent by stirring at 60° C. for 10 hours, by which, homogenous solution A is obtained. Solution A is then cooled to room temperature for later use.
2) Spinning the spinning stock solution obtained in step 1) in a single-needle electrospinning device for 20 hours under the condition of 20 kV high voltage, the flow rate of the syringe pump is set to 0.1 ml/h, and the receiving distance is 20 cm; using aluminium foil as the receiving substrate. After that, the pre-treated electrospun polyurethane nanofiber film is prepared and formed on the aluminium foil.
3) Providing an airtight container, to which solvent C prepared by the mixed solvent prepared in step 1) and deionized water in volume ratio 1:2 is sprayed. Arranging the prepared film, prepared in step 2), in the airtight container, at ambient temperature 30° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 15 μm, and the average diameter of the nanofibers is 350 nm.

Embodiment 8

1) Dissolving 6 grams of solid thermoplastic polyurethane (TPU) in 34 grams of solvent dimethyl sulfite (DMSO) by stirring at 60° C. for 10 hours, by which homogenous solution A is obtained. Solution A is then cooled to room temperature for later use.

2) At room temperature, adding 0.1 gram of octadecyltrimethylammonium chloride to 9.9 grams of DMSO, and then stirring it to obtain solution B.
3) Mixing solution A and solution B in a weight ratio of 40:10, respectively, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 20 hours under the condition of 20 kV high voltage, the flow rate of the syringe pump is set to 0.2 ml/h, and the receiving distance is 10 cm; using aluminium foil as the receiving substrate. After that, the pre-treated electrospun polyurethane nanofiber film is prepared and formed on the aluminium foil.
After a period of time, peeling the electrospun polyurethane nanofiber film off from the aluminium foil and resting the peeled film at room temperature for 12 hours. The average thickness of the peeled film, i.e. polyurethane nanofiber film, is 15 μm, and the average diameter of the nanofibers is 200 nm.

Embodiment 9

1) Dissolving 5 grams of solid thermoplastic polyurethane (TPU) in 40 grams of solvent dimethyl sulfite (DMSO) by stirring at 60° C. for 10 hours, by which homogenous solution A is obtained. Solution A is then cooled to room temperature for later use.
2) At room temperature, adding 0.05 gram of potassium chloride (KCl), 0.05 gram of potassium bromide (KBr), 0.1 gram of potassium carbonate (K$_2$CO$_3$) to 4.8 grams of DMSO, and then stirring it to obtain solution B.
3) Mixing solution A and solution B in a weight ratio of 45:5, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 20 hours under the condition of 28 kV high voltage, the flow rate of the syringe pump is set to 0.1 ml/h, and the receiving distance is 20 cm; using aluminium foil as the receiving substrate. After that, the pre-treated electrospun polyurethane nanofiber film is prepared and formed on the aluminium foil.
5) Providing an airtight container, to which solvent C prepared by DMSO and deionized water in volume ratio 1:4 is sprayed. Arranging the prepared film, prepared in step 4), in the airtight container, at ambient temperature 35° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 15 μm, and the average diameter of the nanofibers is 300 nm.

Embodiment 10

1) Preparing a mixed solvent with dimethyl sulfite (DMSO) and tetrahydrofuran (THF) in volume ratio of 1:2. Dissolving 8 grams of solid thermoplastic polyurethane (TPU) in 27 grams of the mixed solvent by stirring at 60° C. for 10 hours, by which, homogenous solution A is obtained. Solution A is then cooled to room temperature for later use.
2) At room temperature, adding 0.2 gram of potassium chloride (KCl) to 14.8 grams of the mixed solvent prepared in step 1), and then stirring it to obtain solution B.
3) Mixing solution A and solution B in a weight ratio of 35:15, stirring it at room temperature until a viscous and transparent spinning stock solution is obtained. The spinning stock solution is then cooled to room temperature for later use.
4) Spinning the spinning stock solution obtained in step 3) in a single-needle electrospinning device for 25 hours under the condition of 25 kV high voltage, the flow rate of the syringe pump is set to 0.1 ml/h, and the receiving distance is 20 cm; using aluminium foil as the receiving substrate. After that, the pre-treated electrospun polyurethane nanofiber film is prepared and formed on the aluminium foil.
5) Providing an airtight container, to which solvent C prepared by the mixed solvent prepared in step 1) and deionized water in volume ratio 1:1 is sprayed. Arranging the prepared film, prepared in step 4), in the airtight container, at ambient temperature 35° C. for a period of time. After that, peeling the electrospun polyurethane nanofiber film off from the aluminium foil and resting the peeled film at room temperature for 12 hours. The average thickness of the peeled film, i.e. polyurethane nanofiber film, is 20 μm, and the average diameter of the nanofibers is 200 nm.

Embodiment 11

1) Dissolving 6 grams of solid thermoplastic polyurethane (TPU) in 34 grams of solvent N,N-dimethylformamide (DMF) by stirring at 60° C. for 10 hours, by which homogenous solution A is obtained. Solution A is then cooled to room temperature for later use.
2) At room temperature, adding 0.1 gram of lithium chloride (LiCl) to 9.9 grams of DMF, and then stirring it to obtain solution B.
3) Mixing solution A and solution B in a weight ratio of 40:10, stirring it at room temperature until a viscous and transparent spinning stock solution is obtained. The spinning stock solution is then cooled to room temperature for later use.
4) Spinning the spinning stock solution obtained in step 3) in a multi-channel needle-free electrospinning device for 20 minutes under the condition of 80 kV high voltage. After that, the pre-treated electrospun polyurethane nanofiber film is prepared and formed on the aluminium foil.
5) Providing an airtight container, to which solvent C prepared by DMF and deionized water in volume ratio 1:1 is sprayed. Arranging the prepared film, prepared in step 4), in the airtight container, at ambient temperature 25° C. for a period of time. After that, peeling the electrospun polyurethane nanofiber film off from the aluminium foil and resting the peeled film at room temperature for 12 hours. The average thickness of the peeled film, i.e., polyurethane nanofiber film, is 15 μm, and the average diameter of the nanofibers is 250 nm.

Embodiment 12

1) Dissolving 5 grams of solid thermoplastic polyurethane (TPU) in 40 grams of solvent N,N-dimethylformamide (DMF) by stirring at 60° C. for 10 hours, by which homogenous solution A is obtained. Solution A is then cooled to room temperature for later use.
2) At room temperature, adding 0.1 gram of lithium chloride (LiCl) to 4.9 grams of DMF, and then stirring it to obtain solution B.
3) Mixing solution A and solution B in a weight ratio of 45:5, stirring it at room temperature until a viscous and transparent spinning stock solution is obtained. The spinning stock solution is then cooled to room temperature for later use.
4) Spinning the spinning stock solution obtained in step 3) in a multi-channel needle-free electrospinning device for 20 minutes under the condition of 80 kV high voltage; using aluminium foil as the receiving substrate. Resting at room temperature for 2 hours, the electrospun polyurethane nanofiber film is prepared, in which, the average thickness of the polyurethane nanofiber film is 15 μm, and the average diameter of the nanofibers is 300 nm.

Comparative Embodiment (Control)

Preparing a film in a way as illustrated in embodiments 1-12 however without adding salts and without subject to solvent vapor welding treatment.

Although different solvents are used in illustrative examples above, it shall be understood that solvents suitable for preparing solutions A & B, and solvent C for the method according to the present invention are, based on experiment results, selected from a group consisting of acetone, N,N-dimethylformamide, N, N-dimethylacetamide, tetrahydrofuran, acetonitrile, ether, ethane, ethanol, formic acid, acetic acid, chloroform, carbon tetrachloride, sulfolane, pyrimidine, formamide, n-hexane, chlorobenzene, dioxane, vinyl glycol, methylcyclohexane, 1,2-Dichloroethylene xylene, cyclohexane, pentane, anisole, butyl acetate, isopropyl acetate, dimethyl alum, N-methylpyrrolidone, dichloromethane, dichloroethyl alkane, chloromethane, benzene, toluene, ethyl acetate, and a combination thereof. It shall be understood that any solvent or mixed solvent that can semi-dissolve or partially dissolve the electrospun film falls into the scope of the present invention. For sake of brevity, performances of films prepared by different solvents or mixed solvents are not described herein.

Although different salts are used as illustrative examples in embodiments 1, 2, 4-6, and 8-12, it shall be understood that salts for the method according to the present invention can be selected from inorganic salt selected from a group comprising lithium chloride, sodium chloride, potassium chloride, lithium carbonate, sodium carbonate, potassium carbonate, sodium bicarbonate, lithium nitrate, sodium nitrate, and a combination thereof; and/or organic salt selected from a group comprising octadecyltrimethylammonium chloride, tetraethylammonium bromide, and a combination thereof.

It shall be understood that every specific numerical point for parameter described in embodiments in this context (for example: mixing ratio between solvents/solutions, solubility of solvent/solution to polymer, parameter(s) in solvent vapor welding) can be used as an end point for a numerical range for said parameter in embodiments according to the present invention. In other words, said end point is included in the numerical range. It shall also be understood that every numerical value in said numerical range can be an end point for another numerical range for said parameter in embodiments according to the present invention.

The films prepared in the embodiments are subjected to the following tests:
  Scanning electron microscope surface characterization. The film surface was characterized by scanning electron microscope FEI Quanta 250.
  Moisture permeability test. According to the standard GB/T 12704.1-2009 "Textiles—Test Method for Moisture Permeability of Fabrics—Part 1: Moisture Absorption Method" to determine the moisture permeability of nanofiber membranes.
  Tensile performance test. According to the standard GB/T1040.1-2018 "Determination of Tensile Properties of Plastics"—cutting the sample into strips with a width of 10 mm; using Instron 5942 to test the tensile properties of the fiber film, with the effective tensile length 20 mm, the tensile speed at 5 mm/min; and taking the average value represents the mechanical properties of the nanofiber membrane.

Test results for thickness, moisture permeability, broken strength, elongation at break for embodiments 1-14 are list in table 1, as below:

TABLE 1

| Embodiment # | Salts | Solvent vapor welding | thickness (μm) | moisture permeability (g/m² · 24 h) | broken strength (MPa) | elongation at break (%) |
| --- | --- | --- | --- | --- | --- | --- |
| 1 | √ | √ | 15 | 21500 | 28.5 | 118 |
| 2 | √ | √ | 15 | 20000 | 20 | 125 |
| 3 | x | √ | 20 | 19200 | 19 | 92 |
| 4 | √ | x | 10 | 20500 | 11.6 | 104 |
| 5 | √ | √ | 15 | 13000 | 27 | 112 |
| 6 | √ | √ | 10 | 21200 | 9.5 | 124 |
| 7 | x | √ | 15 | 16320 | 17 | 101 |
| 8 | √ | x | 15 | 11880 | 10 | 122 |
| 9 | √ | √ | 15 | 14200 | 17.9 | 121 |
| 10 | √ | √ | 20 | 17050 | 19 | 110 |
| 11 | √ | √ | 20 | 15800 | 20 | 89 |
| 12 | √ | x | 10 | 11960 | 12 | 133 |
| control | x | x | 15 | 10320 | 10 | 90 |

1) It is known from the above table that in embodiments 1, 2, 4-6, and 8-10, the spinning stock solutions for electrospinning the polyurethane films are prepared by adding different salts. Results show that the fiber diameters of the films of embodiments 1, 2, 5, and 8 are smaller than that of the control. In addition, results show that as the concentration of salt increases in the electrospinning stock solution, a trend of the fiber diameter first decreases then increases.

Addition of salts according to the present invention provides a novel and inventive means to adjust, in particular, improve the conductivity of the electrospinning stock solution, which is used to optimize the electrospinning process for making fibers. The diameter of the fibers produced according to the present invention is reduced due to self-adhesion between fibers, whereby the degree of crosslinking between the fibers is controllable, providing technical advantages that the porosity of the nanofibers-based film is increased, the mechanical properties of the film is enhanced. Therefore, the nanofiber diameter of the polyurethane film can be adjusted by adjusting the concentration of the salt added in the spinning stock solution, thereby improving the moisture permeability and the mechanical properties of the polyurethane nanofiber film. These performances are consistent with experimental results shown in embodiments 1, 2, 4-6, and 8-10. Results show that in embodiments 3 and 7, which do not add salts during the process of preparing polymer films, fiber diameter in these embodiments are larger leading to poorer mechanical strength. Fabrics prepared with the fibers prepared according to the present invention have good air permeability, moisture permeability and high mechanical strength.

2) It is known from the above table that in embodiments 1-3, 5-6, and 9-10, polyurethane films are post-treated by solvent vapor welding at different temperature. Results of the broken strength tests of these embodiments show that the broken strength of these embodiments are higher than that of the control.

Figure 1:
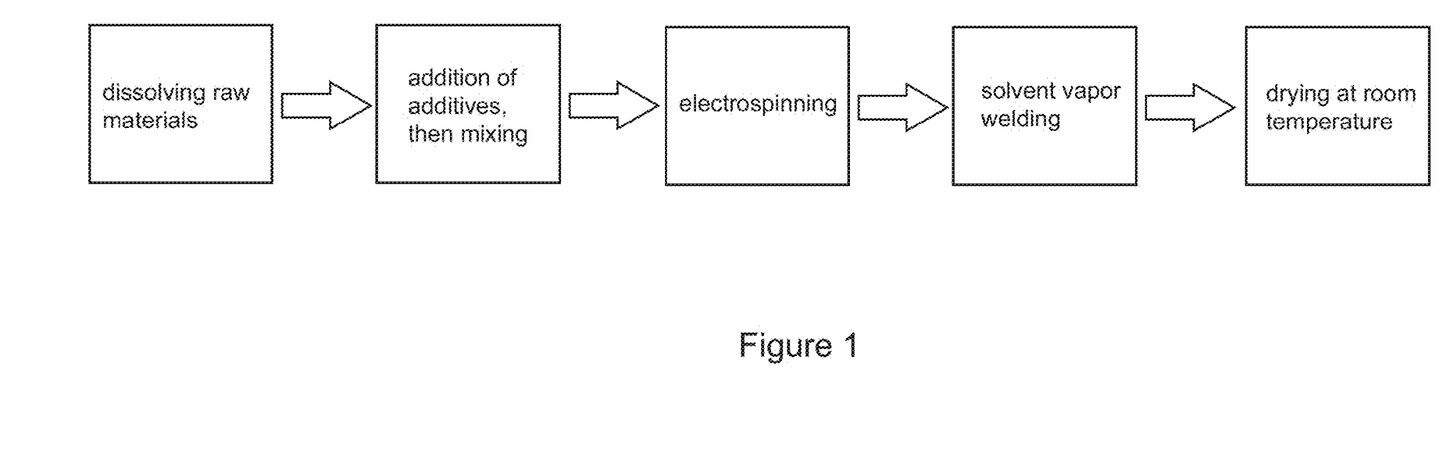
FIG. 1 is a flow chart of the method according to the present invention for preparing high-performance polyurethane nanofiber film based on fiber self-adhesion.
Figure 2:
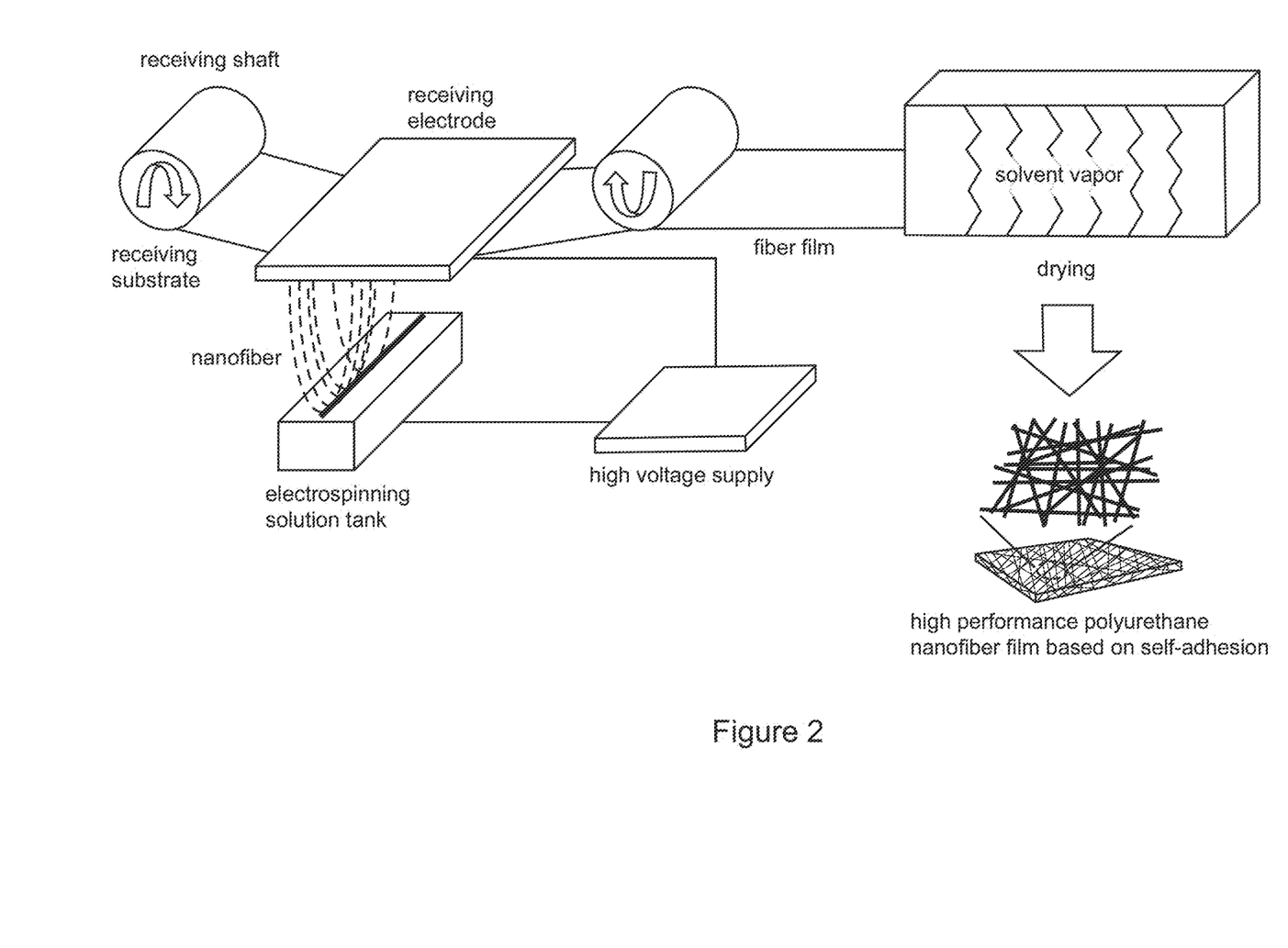
FIG. 2 is a schematic diagram of the method according to the present invention.
Figure 3:
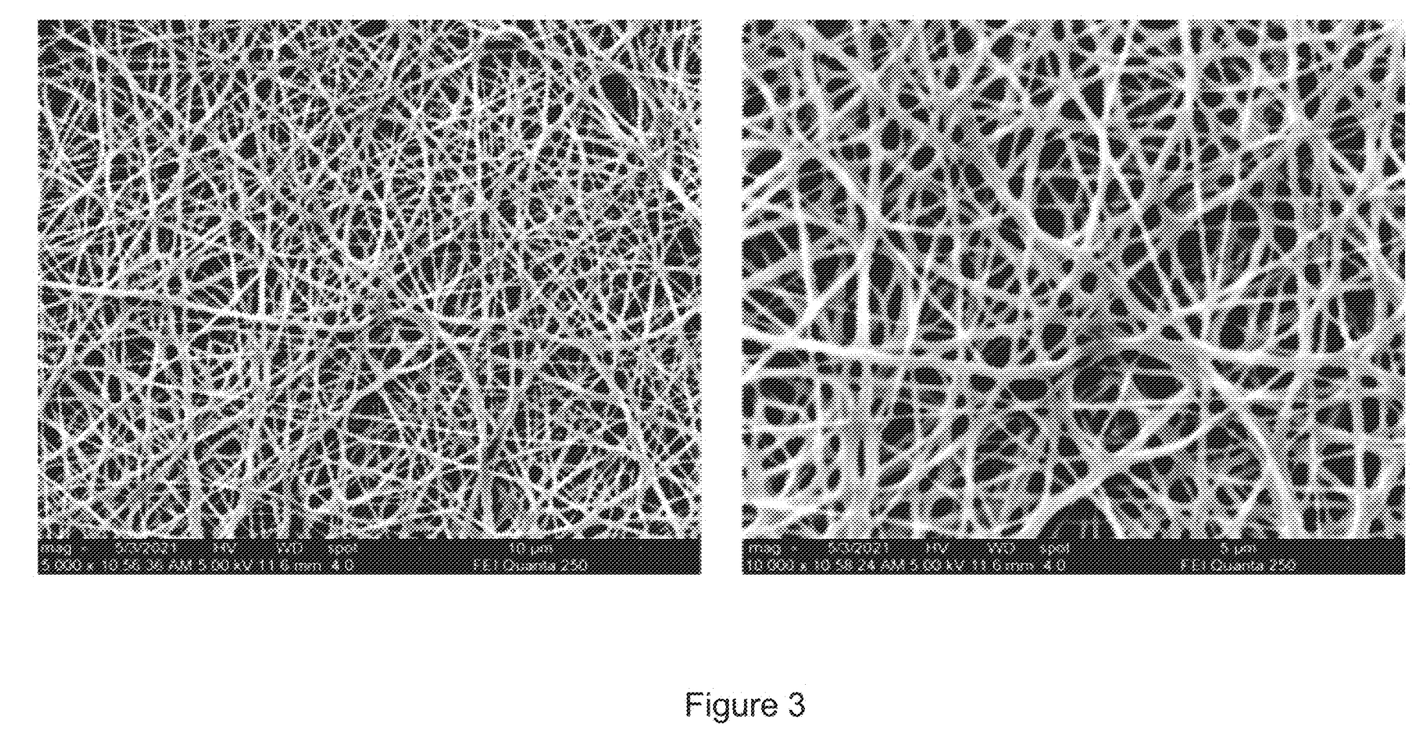
FIG. 3 are scanning electron microscope images of the polyurethane nanofiber film obtained in embodiment 1 of the present invention.
Figure 4:
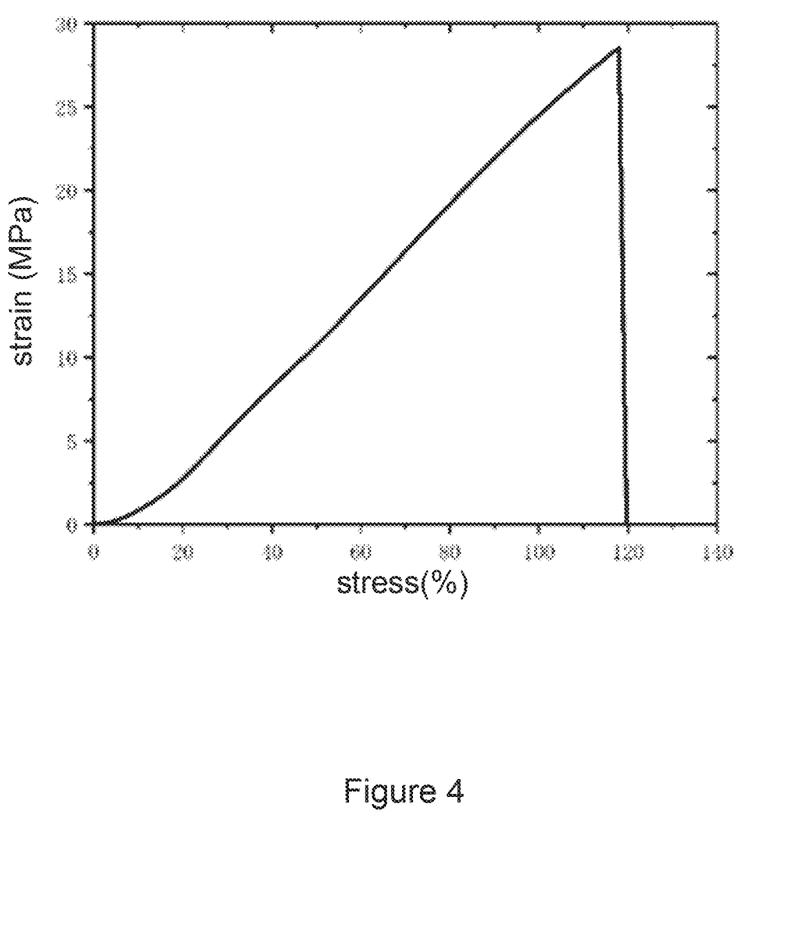
FIG. 4 is the mechanical strength test result of the polyurethane nanofiber film obtained in embodiment 1 of the present invention.

The solvent vapor welding according to the present invention provides a novel and inventive means to semi-dissolve or partially dissolve nanofibers in the electrospun film, with controllable manner, by selected solvent, such that during the drying process, the semi-dissolved or partially dissolved nanofibers physically contacts with each other, in particular in-situ bonded to each other, and thus forming a contact point between each other, as shown in FIG. 3, and eventually forming a bonded robust structure, whereby providing enhanced machinal strength. Experiment results show that before the solvent vapor welding according to the present invention, nanofibers slide under tensile strain, however after the solvent vapor welding according to the present invention, since nanofibers are linked to form a bonded structure, sliding between nanofibers is restricted and therefore the broken strain is enhanced. The present invention provides physical bonding between the electrospun film fibers, enabling an electrospun three-dimensional network structure with strengthening points (the contact points between nanofibers) is constructed, realizing electrospun film prepared according to the present invention with high strength. The obtained electrospun film has better mechanical properties, moisture permeability and hydrostatic pressure resistance. Meanwhile, the preparation according to the present invention is streamlined, simple, and viable to be industrialized.

Therefore, by combining the optimized solvent vapor welding and electrospinning, self-adhesion of fibers bonding can be adjusted, thereby obtaining nanofiber films with excellent mechanical properties.

3) Embodiments 11 and 12 are polyurethane films prepared by multi-channel needle-free electrospinning device. When additives and solvent vapor welding technology are introduced, the performance of the films is significantly improved, realizing the transformation from small-scale single-needle electrospinning to large-scale needle-free electrospinning production.

The description of the above embodiments is only used to help understanding the method and core idea of the present invention. For those of ordinary skill in the art, without departing from the principle of the present invention, several improvements and modifications can be made to the present invention, and these improvements and modifications also fall within the protection scope of the claims of the present invention. Various modifications to these embodiments are obvious to those skilled in the art, and the general principles defined herein can be implemented in other embodiments without departing from the spirit or scope of the present invention. Therefore, the present invention will not be limited to the embodiments shown in this document but should conform to the widest scope consistent with the principles and novel features disclosed in this document and their equivalents.

The invention claimed is:

1. A method for preparing a polyurethane film, comprising the steps of:
   i) dissolving polyurethane into a first solvent to form a first solution;
   ii) dissolving salt into a second solvent to form a second solution;
   iii) preparing a spinning stock solution by mixing said first solution and said second solution;
   iv) spinning said spinning stock solution in an electrospinning device to obtain a polyurethane film;
   v) providing a container to which a third solvent is sprayed; and
   vi) arranging said polyurethane film in said container for a period of time.

2. A method as claimed in claim 1, wherein said polyurethane is a hydrophobic polyester thermoplastic polyurethane.

3. A method as claimed in claim 2, wherein said polyurethane is a ABn-type block linear polymer, wherein A is a polyester and B is a diol.

4. A method as claimed in claim 3, wherein said polyester has molecular weight of 1000-6000.

5. A method as claimed in claim 3, wherein said diol contains 2-12 linear carbon atoms.

6. A method as claimed in claim 3, wherein the chemical structure between the AB segments is diisocyanate.

7. A method as claimed in claim 6, wherein the density of said polyurethane is 1.10-1.25 g/cm3.

8. A method as claimed in claim 1, wherein said salt is
   inorganic salt selected from a group comprising lithium chloride, sodium chloride, potassium chloride, lithium carbonate, sodium carbonate, potassium carbonate, sodium bicarbonate, lithium nitrate, sodium nitrate, and a combination thereof; and/or
   organic salt selected from a group comprising octadecyltrimethylammonium chloride, tetraethylammonium bromide, and a combination thereof.

9. A method as claimed in claim 1, wherein said first solvent, said second solvent, and said third solvent are selected from a group comprising
   acetone, N,N-dimethylformamide, N,N-dimethylacetamide, tetrahydrofuran, acetonitrile, ether, ethane, ethanol, formic acid, acetic acid, chloroform, carbon tetrachloride, sulfolane, pyrimidine, formamide, n-hexane, chlorobenzene, dioxane, vinyl glycol, methylcyclohexane, 1,2-Dichloroethylene xylene, cyclohexane, pentane, anisole, butyl acetate, isopropyl acetate, dimethyl alum, N-methylpyrrolidone, dichloromethane, dichloroethyl alkane, chloromethane, benzene, toluene, ethyl acetate, and a combination thereof.

10. A method as claimed in claim 1, wherein the weight ratio of said polyurethane in said first solution is 15-30%.

11. A method as claimed in claim 10, wherein the weight ratio of said salt in said second solution is 0.1-2%.

12. A method as claimed in claim 11, wherein the weight ratio of said first solution to said second solution ranges from 50:0 to 35:15.

13. A method as claimed in claim 1, wherein said third solvent is prepared by mixing said first solvent with water.

14. A method as claimed in claim 13, wherein said water is deionized water.

15. A method as claimed in claim 1, wherein step vi) in claim 1 is carried out at temperature 25-35° C.

16. A method as claimed in claim 1, wherein step vi) in claim 1 is carried out at humidity 30%-85% and/or the amount of said third solvent sprayed is 0.5 to 5 ml.

17. A method as claimed in claim 1, wherein step iv) in claim 1 is carried out in a single-needle electrospinning device, with at least one of the following parameters:
   applied voltage at 20-30 kV, the flow rate of syringe pump at 0.1-1.0 ml/h, the receiving distance at 10-20 cm, the ambient temperature at 23-35° C., the ambient humidity at 35%-85%, the receiving substrate is selected from aluminum foil, oil paper, fabric or non-woven fabric.

18. A method as claimed in claim 1, wherein step iv) in claim 1 is carried out in a needle-free electrospinning device, with at least one of the following parameters:
   applied voltage at 50-80 kV, the receiving distance at 20-50 cm, the ambient temperature at 23-35° C., the ambient humidity at 35%-85%, the receiving substrate is selected from aluminum foil, oil paper, fabric or non-woven fabric.

19. A method as claimed in claim 18, wherein said needle-free electrospinning device is a multi-channel needle-free electrospinning device.

* * * * *